United States Patent Office 3,291,419
Patented Dec. 13, 1966

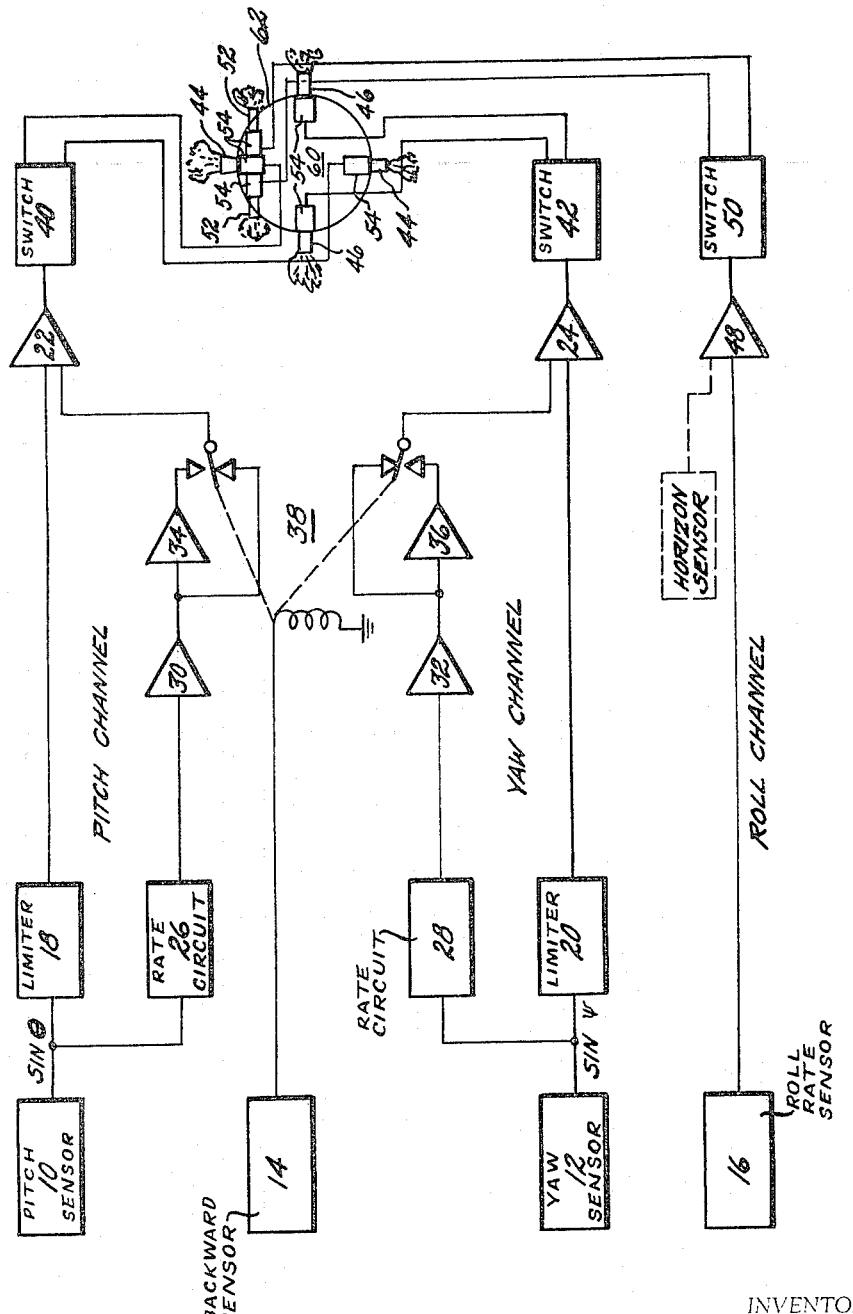

3,291,419
ATTITUDE CONTROL SYSTEM WITH
MAGNETOMETER SENSORS
Lewis David Montague, Menlo Park, and John J. Rodden, Los Altos, Calif., assignors to the United States of America as represented by the Secretary of the Air Force
Filed May 28, 1964, Ser. No. 371,159
3 Claims. (Cl. 244—14)

This invention relates generally to attitude control and, more particularly, to an attitude control system which utilizes magnetometers for attitude and intelligence and which is capable of capturing a vehicle from any initial unknown attitude and motion in order to establish a specific known attitude with respect to the earth.

Magnetometers have been utilized for measurement of the earth's field; however, the magnetometer, which is characteristically a device whose output is proportional to the cosine of the angle between the field vector and the instrument-sensitive axis, has never been considered as a sensing means for providing an attitude reference for reinstating inertial reference with space vehicles.

It is proposed to use magnetometers for attitude sensing in a closed loop control system such that a vehicle tumbling in space either due to loss of intelligence or impulse control, or one requiring control in the terminal phase of its mission, is dependent upon the elements in an attitude control system such that temporary loss of the earth's reference would result in mission failure. Horizon scanners, star trackers, and sun sensors, which are presently utilized for attitude control, all have a limited field of view and would be ineffective for recapturing a vehicle tumbling in space.

Accordingly, it is a primary object of this invention to provide an attitude control system which utilizes magnetometer sensors.

It is another object of this invention to provide an attitude reference for reinstating inertial reference.

It is still another object of this invention to provide an attitude control system utilizing magnetometer sensors for controlling on-off gas actuated control means for orienting an orbital vehicle to the direction of the earth's local magnetic flux.

It is a further object of this invention to provide an auxiliary system to back up critical on-orbit guidance and control functions of an orbitting satellite.

It is a still further object of this invention to provide an attitude control system which utilizes magnetometer sensing means which have no moving parts.

Still another object of this invention involve the provision of an attitude control system whose only moving parts are valve solenoids and whose attitude reference is the earth's magnetic field.

An additional object of this invention involves the utilization of simple magnetic sensors which are capable of operation in any orientation with unlimited life and having unique means for utilizing rate circuits on nonlinear outputs.

Still another object of this invention involves the provision of an attitude control system which utilizes conventional, currently available materials that lend themselves to standard mass production manufacturing techniques.

These and other advantages, features and objects of the invention will become more apparent from the following description taken in connection with the illustrative embodiments in the accompanying drawings, wherein the figure is a block diagram which schematically depicts the attitude control system of this invention.

Present complex attitude control systems utilize inertial instruments and optical scanning devices to maintain attitude reference. These systems, besides being complex, require the maintenance of a reference from launch and do not have the ability to acquire a desired reference from unknown initial conditions.

Th device employs an unique switching technique to maintain stable damping in virtually any attitude although the sensor signals are nonlinear.

The control system which has been evolved is capable of bringing under control a tumbling space vehicle which has random orientation with body rates up to 20° per second along any combination of vehicle axes such that the vehicle would be maintained pointing within + or −10° of a desired orientation for at least 30 seconds. The system evolved comprises a three axis contactor or on-off servo which offers extreme simplicity in mechanism, high reliability and efficiency in operation and performance.

The system presented is designed to perform this reacquisition function by aligning the vehicle longitudinal axis parallel to the local magnetic field vector, which is defined well with respect to the earth, at any given location. For some applications, this capability alone is sufficient and no roll attitude information is required. The general case, however, requires specific orientation of the vehicle about its roll axis and a simple tristable infrared horizon sensor would be added to the mechanization as shown in the figure.

The magnetometer is characteristically a device whose output is proportional to the cosine of the angle between the field vector and the instrument-sensitive axis. It is desired to use the instruments for null sensing and the pitch and yaw magnetometers therefore should be mounted perpendicular to each other such that their output is proportional to the sine of the angle $\alpha$ between the vehicle roll axis and the magnetic field vector (H) in the plane of the instruments.

In the application presented here, consisting of orienting a symmetric vehicle in the direction of the local magnetic field vector excluding, for the time being, a roll attitude requirement, the designation of pitch and yaw axis becomes arbitrary. However, for the purposes of design, analysis, and test, it is convenient to speak of the pitch and yaw axis. The vehicle is rotating coordinate system and the magnetometers perform their functions of resolving the vector quantity $H \sin \alpha$ into the pitch and yaw channels regardless of roll attitude. Although roll position information is not required for attitude reference, it will be shown that roll control is necessary in this system to assure stable dynamic performance.

The use of magnetometers for attitude sensors offers particular advantages in view of the design criteria. First, the magnetometer coupled with the earth's field establishes a reference direction regardless of vehicle orientation and rate without the need for erection or knowledge of initial conditions. It is this unique capability that makes the system possible. Second, the magnetometer has no moving parts. The associated electronics are minimum, commensurate with the weight and packaging requirements.

To provide system damping for stable operation requires some type of attitude lead information. This could be provided either by rate gyros or lead circuits. Lead circuits were selected to provide damping information on the basis of its inherent reliability.

Following analog simulation of the control system and vehicle dynamics, it was found that even small roll rates ($>5°$/sec.) contaminated the differentiated pitch and yaw rate signals, thus destabilizing the operation. This effect was not to gyroscopic coupling, but a phenomen directly due to the use of rate circuits that detect significant effects or even relatively small roll rates that degrade performance. Therefore, it was found necessary to add a roll channel to the design, which uses a rate gyro for control measurement.

The system evolved to satisfy the design uses a three axis contactor or on-off servo as illustrated in the figure. The system consists of identical magnetometer sensors 10 and 12 which are mounted to be mutually perpendicular along the X and Y axes with identical pitch and yaw channels that use attitude and rate circuit feedback signals, and a roll channel using a rate gyro sensor 16 for control measurement.

The instrumentation for this attitude control system measures the "components" of pitch and yaw angles from the reference direction. In both the pitch and yaw channels, the attitude signal is differentiated and limited independently. The limited position signal and the rate signal are then summed. In order to effect this instrumentation there is shown in the figure a limiter at 18 and at 20 for the pitch and yaw channels, respectively, and the outputs of the limiters are connected to summing amplifiers 22 and 24, respectively. The pitch and yaw magnetometers 10 and 12, respectively are also connected in series with rate filters 26 and 28 which differentiate and amplify the magnetometer signals for presentation to + rate amplifiers 30 and 32 and − rate amplifiers 34 and 36. When the summed autopilot signal exceeds the preset threshold value (deadband, $\theta_D$) the control force is actuated. The sign of both the pitch and yaw rate feedback is reversed when the vehicle's X axis is pointed rearward from the reference direction. The third magnetometer 14 is used to sense this backward condition and is mounted along the vehicle axis. Dependent upon the signal presented by the magnetometer 14, a relay 38 is actuated such that either of the pairs of rate amplifiers 30, 32 or 34, 36 are connected to their respective summing amplifiers 22 and 24. The outputs from the summing amplifiers 22 and 24 are applied to electronic deadband switches 40 and 42 which actuate the pitch and yaw nozzles 44 and 46, respectively.

The roll channel is even simpler than those for pitch and yaw. The output of the roll rate gyro is connected directly through suitable amplification at 48 to an electronic deadband switch 50 that actuates the roll nozzles 52. The nozzle configuration may produce roll forces that are unbalanced. A control force to correct roll rate gives a torque disturbance into the yaw channel. This effect is not harmful since the greatest use of the roll actuator is within the first few seconds of system operation and rarely is used thereafter provided the ratio of torque to moment of inertia about the roll axis of the vehicle is large compared to the torque to moment of inertia about the pitch or yaw axis. The effect is further minimized by moving the roll valves forward toward the center of mass. The advantage of the unbalanced roll actuators is to allow a simpler system mechanization with completely isolated roll instrumentation and electronics.

In order to effect control of the nozzles the switches 40, 42 and 50 could be made to actuate solenoids 54 at each nozzle to effectuate a connection of each nozzle with a source of pressurized gas 60 in a vehicle 62.

The attitude sensing instruments that give a sinusoidal function of the attitude error have a false null at 180°. The on-off system cannot stabilize at this point. However, unless prevented, the system needlessly would accelerate the vehicle away from the backward orientation and in the process build up the body rate that must be decelerated with considerable consumption of the stored fuel.

An arrangement shown produces a more efficient control operation in that it provides an isolated rate signal and a sign changing amplifier along with a relay for switching in either sign of the rate in the final summing amplifier. The switching signal is to come from the backward orientation sensing magnetometer 14. When the rate feedback is reversed, the sign of the equation changes.

In order to capture stability of vehicles having high initial rates the attitude error may be limited. The effect of this is to distort the switching curve so that converging trajectories can continue without switching for longer periods than the previous schemes allow.

Attitude limiting gives improved convergence of the trajectory with attitude limit. In general, the gas impulse for acquisition is reduced with decreases in the attitude limit but the time to converge increases. The limiting case for decreasing the attitude limit is the removal of position control for which the system would stop any vehicle motion, but never orient the vehicle in the desired direction.

The influence of minor variations in system gains and hardware nonlinearities did not influence greatly the acquisition or capture phase of motion. The anomalies of operation of the actuation, such as hysteresis and time lags, are of particular significance only in determining the steady-state limit cycle.

As previously mentioned, the analog investigation of an attitude control system using differentiating networks for rate signal showed that unsatisfactory control performance resulted from the presence of roll rates higher than a few degrees per second. A high percentage of initial vehicle orientations could not be brought under control if significant roll rates existed (greater than 5°/sec.) and those that were controllable required an excessive amount of control impulse. This phenomenon would not exist if rate gyros were used in place of the lead circuits.

To compensate for the deleterious effects of cross coupling would be the removal of the effect, e.g., a roll control channel. The roll control channel reduces roll rate to an acceptably low level (<2° sec.).

With the decision to control roll rate in the vehicle, the analysis and understanding of planar on-off control systems can be applied to the problem. With roll rate control, the vehicle spin rate is controlled to be within a threshold value within a few seconds of system activation and the vehicle is brought under control or acquired for any arbitrary orientation. This overall stability did not exist in the system without roll control.

Thus, there has been presented an attitude control system which provide a signal for controlling solenoid valves which in turn control the ejection of gas from a source to orient tumbling vehicle with respect to the earth's magnetic field.

Although the invention has been described relative to a particular embodiment, it should be understood to those skilled in the art that the invention is capable of a variety of alternative embodiments. We intend to be limited only by the spirit and scope of the appended claims.

We claim:

1. A closed loop, null sensing attitude control system for a vehicle comprising a magnetometer whose output is proportional to the cosine of the angle between the field vector and the instrument sensitive axis, circuitry associated with said magnetometer, said circuitry comprising a limiting circuit connected with the output of said magnetometer, a differentiating circuit connected with said output of said magnetometer, a summing amplifier connected to add the limited position signal from said limiting circuit and the rate signal from said differentiating circuit, control means connected with the output from said summing amplifier for changing the forces acting on said vehicle to effect a desired orientation of said vehicle, a second magnetometer and associated cricuitry identical to said first-mentioned magnetometer and associated circuitry, said second magnetometer being mounted with its instrument sensitive axis perpendicular to said first-mentioned magnetometer, said second magnetometer and associated circuitry being connected to said control means to control the forces acting on said vehicles to reflect a desired orientation of said vehicle with respect to the instrument sensitive axis of said second magnetometer, and a third magnetometer for sensing forward or reverse direction of said vehicle, a relay connected with said third magnetometer, plus and minus rate amplifiers between each of the differentiating circuits and the summing amplifiers of the associated circuits of said first and second magnetometers, said third magnetometer being connected to operate said relay to connect one of the outputs of said plus or minus rate amplifiers with the summing amplifier of the associated circuits.

2. A system as defined in claim 1 including a rate gyro, said gyro being connected to said control means to control forces which stabilize the vehicle in roll.

3. A system as defined in claim 2 including solenoid valves in said control means and operated in response to the summing amplifiers of said associated circuits for controlling gases emanating from said control means for effecting changes in vehicle orientation.

References Cited by the Examiner

UNITED STATES PATENTS

| | | | |
|---|---|---|---|
| 2,826,380 | 3/1958 | Ketchledge | 244—14 X |
| 3,039,692 | 6/1962 | Lohneiss et al. | 235—183 |
| 3,061,239 | 10/1962 | Rusk | 244—14 X |
| 3,232,561 | 2/1966 | Adams | 244—1 |

BENJAMIN A. BORCHELT, *Primary Examiner.*

M. F. HUBLER, *Assistant Examiner.*